March 7, 1961 P. BOURASSA 2,973,720
TRANSPORTATION APPARATUS
Filed May 4, 1959 3 Sheets-Sheet 3
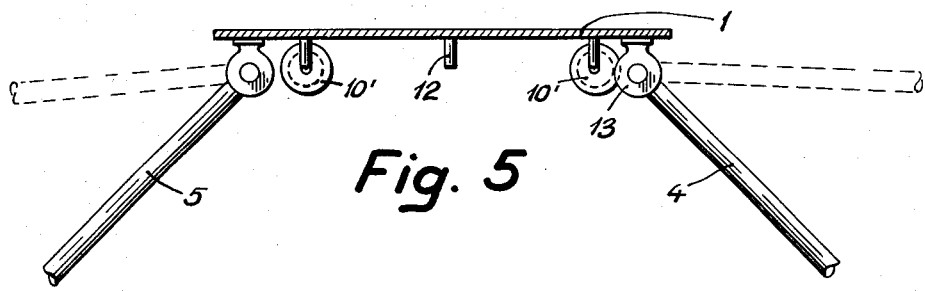
Fig. 5
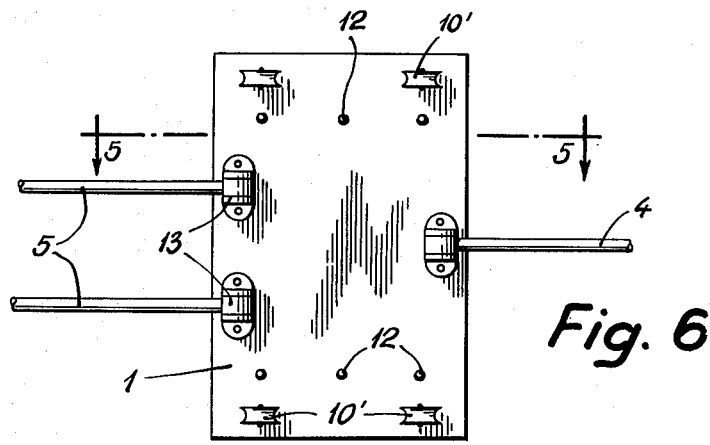
Fig. 6
Fig. 7
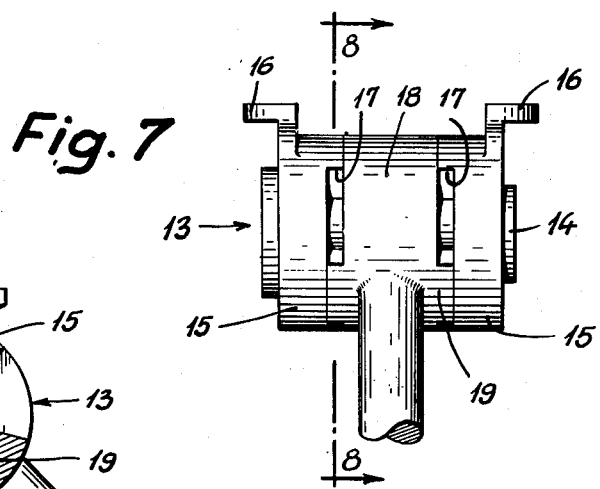
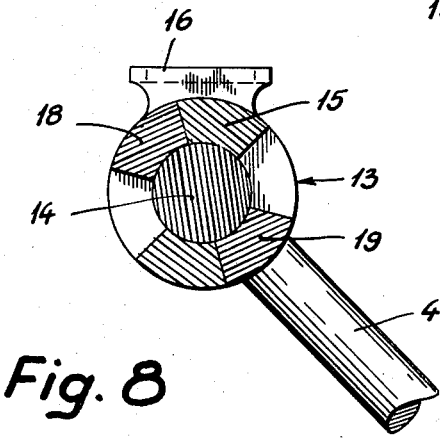
Fig. 8
INVENTOR
Pierre BOURASSA
BY Pierre Lespérance
PATENT AGENT

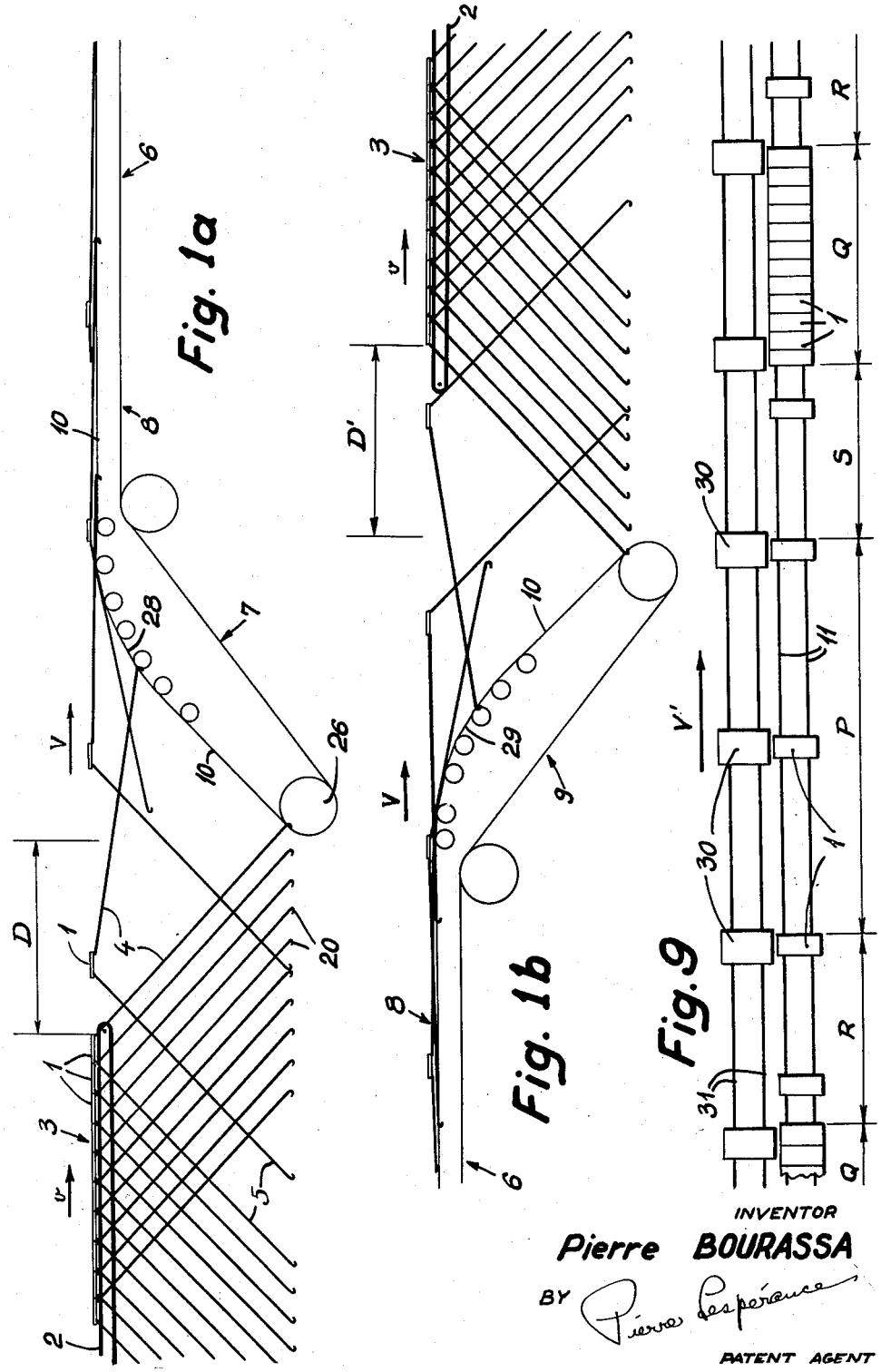

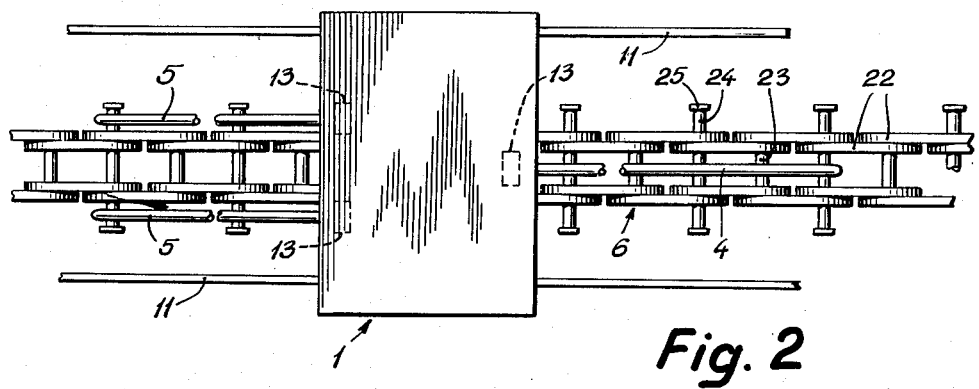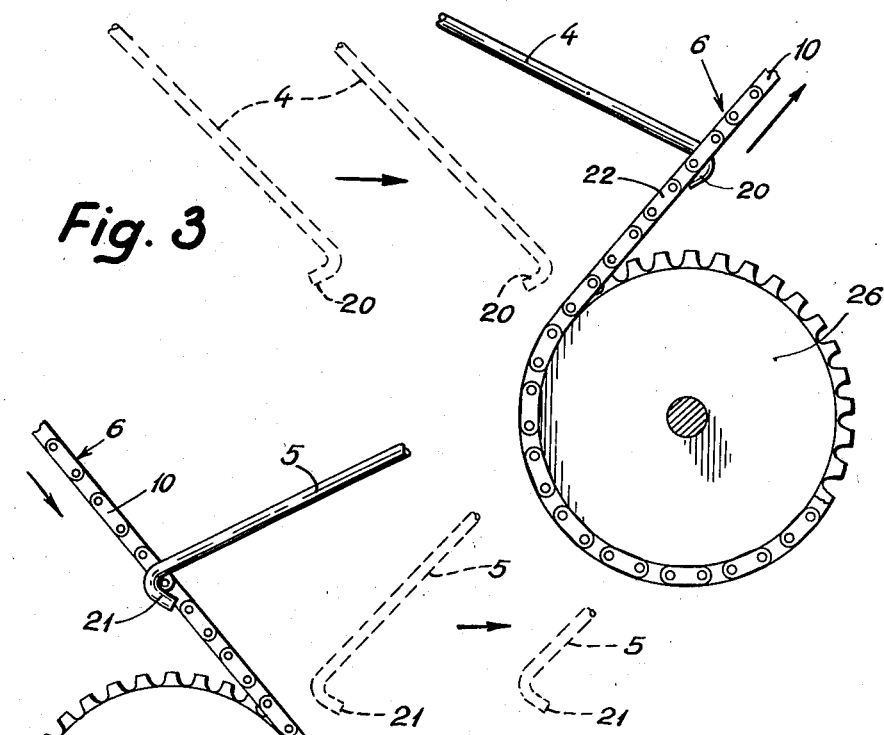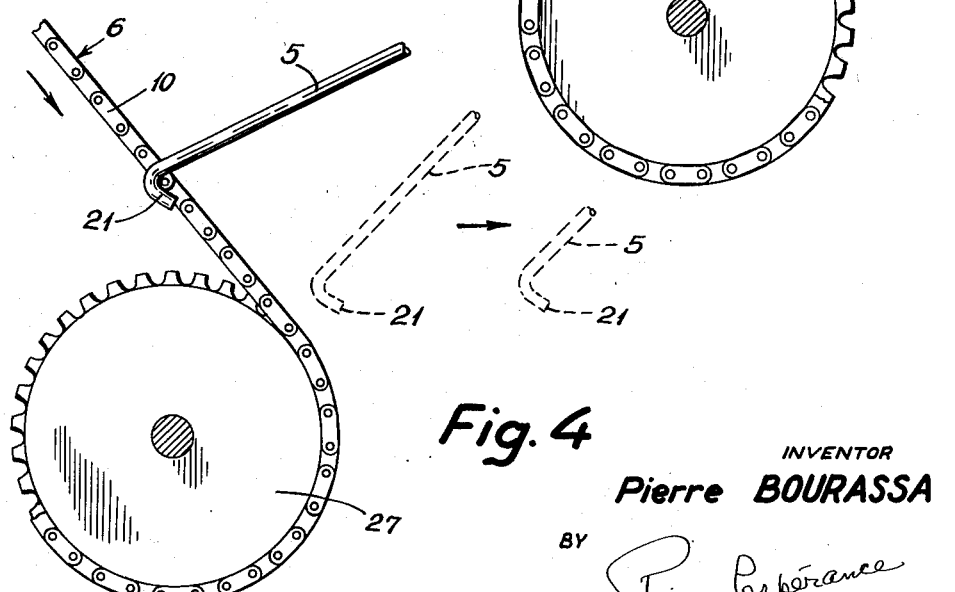

United States Patent Office 2,973,720
Patented Mar. 7, 1961

2,973,720

TRANSPORTATION APPARATUS

Pierre Bourassa, 4929 Patricia Ave., Montreal, Quebec, Canada

Filed May 4, 1959, Ser. No. 810,734

11 Claims. (Cl. 104—20)

The present invention relates to a transportation apparatus, more particularly adapted for transporting passengers, such apparatus being capable of application either as an underground or an overhead public transportation system.

Various types of passenger transportation apparatus have already been proposed and one of them is described in an article entitled "Passenger Conveyors Are Here" by Paul W. Freitag, Jr., in the March 1954 issue of the publication "Consulting Engineer" and is patented in U.S. Patent 2,756,686 of July 31, 1956.

In this system, small vehicles or cabs are accelerated by a plurality of rubber tire rollers rotating at progressively increasing speeds and engaging the underface of the cabs. Friction, which occurs between the cabs and the rollers rotating at different speed, is a disadvantage of this system. Another disadvantage is the fact that the cabs are not synchronized in their movement.

It is an object of the present invention, to obviate the above noted disadvantage by providing a new method and improved means for accelerating and decelerating cabs or platforms in a public transportation system.

Another object of the present invention resides in the provision of accelerating and decelerating means for passenger cabs or platforms which operate so as to entirely eliminate sudden jerks.

Yet another important object of the present invention is the provision of a transportation apparatus in which the above noted means are so arranged as to perfectly synchronize the accelerating and decelerating movements of the successive platforms composing the transportation apparatus.

Yet another important object of the present invention is the provision of a transportation apparatus in which means are provided for moving a plurality of separate platforms or cabs at a constant low speed past a loading station and another conveyor is provided serving as an accelerating conveyor, a high speed conveyor and a decelerating conveyor for successively accelerating the platforms and moving the same at high speed and finally decelerating said platforms for bringing them back to the low constant speed past an unloading station.

One application of the system of the present invention is in conjunction with the loading and unloading of cabs moving at a constant high speed on a main track.

The foregoing and other objects of the present invention will become more apparent during the following disclosure and by referring to the drawings in which:

Figure 1a is a diagrammatic side elevation of the loading part of the low speed conveyor at a loading station and the accelerating part of the combined accelerating, high speed and decelerating conveyor;

Figure 1b shows the decelerating part of the combined conveyor and unloading part of the low speed conveyor;

Figure 2 is a top plan view of a platform and associated combined conveyor;

Figure 3 is a partial view of the accelerating part of the combined conveyor and the front hook of a platform showing how said hook engages the combined conveyor;

Figure 4 is a side elevation of the end of the decelerating part of the combined conveyor showing how the trailing hooks of the platform become disengaged;

Figure 5 is a longitudinal section of a platform taken along line 5—5 of Figure 6;

Figure 6 is a bottom plan view of a platform;

Figure 7 is a detailed front view of the hinge connection of a hook;

Figure 8 is a cross-section along line 8—8 of Figure 7; and

Figure 9 is a schematic diagram in plan view of the transportation system.

Referring now more particularly to the drawings in which like reference characters indicate like elements throughout, the system of the present invention consists essentially in a series of small platforms 1 engageable with a low speed conveyor 2 for moving past a loading and unloading station 3 at a constant low speed to enable pedestrians to embark on the platforms. The platforms are provided with a front hook 4 and a pair of trailing hooks 5, said hooks being pivotally attached to each platform and means being provided for maintaining the hooks at a substantial angle with respect to the vertical.

A high speed combined conveyor 6 is arranged with an accelerating section 7, a constant high speed section 8 and decelerating section 9. The combined conveyor 6 is characterised by the fact that its top run 10 moves at a constant speed but changes its direction from an inclined to a horizontal direction and back to an inclined direction. The shape of the curve made by the conveyor and the length and rest angle of the front hook are such that the value of the differencec between the horizontal vector components of the translational movement of said top run 10 and of the pivotal movement of the front hook is progressively increasing from the low speed $v$ of conveyor 2 to the high speed $V$ of the conveyor 6. The ratio $V/v$ may attain a value of ten or more because when front hook 4 swings from its inclined rest position into horizontal position the horizontal vector component of its pivotal movement decreases to zero, first slowly and then rapidly, while the horizontal vector component of movement of the combined conveyor increases to a maximum. Thus the initial difference between the two values may be made very small.

Each platform 1 may have any shape desired or may be in the form of a cab with enclosing sides and roof. It may have for instance the dimensions of an escalator step whereby one or two passengers can step thereon. Each platform 1 could be provided with suitable wheels 10' for free running on tracks 11 which are shown in Figure 2. The wheels 10' are mounted underneath the platform 1 near the sides thereof; each platform may further have pins 12 or other hooking means underneath the same and inwardly of the wheels 10' at both sides of the platform for engaging with the top run of the low speed conveyor 2 whereby said conveyor will move each platform in side by side relationship at the loading and unloading stations on tracks 11.

The front and trailing hooks 4 and 5 are pivotally connected underneath the platform at the front and back thereof by means of a hinge 13; each hinge 13 comprises a pin 14 inserted in stationary collars 15 having ears 16 for fixing the same to platform 1; the opposed face of stationary collars 15 are recessed to form shoulders 17. A central movable collar 18 is pivotally mounted on pin 14 with the side faces of said collar 18 in sliding contact with the opposed end faces of stationary collars 15. Collar 18 has a wider portion 19 defining shoulders adapted to abut shoulders 17 for limiting the angular movement of the central collar 18 with respect to the stationary collars 15. Shoulders 17 and portion 19 are arranged to allow pivotal movement in a vertical plane of the collar 18 and of the hook secured thereto through an angular extent such that the rod or hook can take a horizontal position parallel with the top face of the platform and a downwardly inclined position in respect to said platform. The hooks 4 and 5 normally assume said inclined position under their own weight. There is one front hook disposed at the center of the platform and two trailing hooks on each side of the central vertical plane of the platform. Thus the hooks can freely intercept one another with the platforms 1 in adjacent position. The hooks 4 and 5 are formed by a rod the outer end of which is bent back through a little more than 90°, as clearly shown in Figures 3 and 4 at 20 and 21 respectively.

As shown in Figure 2, the combined conveyor 6 may consist of a chain formed of links 22 interconnected by short pins 23 and long pins 24, said pins alternating with each other and the long pins projecting laterally beyond the links 22 and being provided with heads 25 at their outer end. The front hook 4 of each platform is adapted to engage the pins of the conveyor chain between the links 22 while the trailing hooks 5 are adapted to hook with the long pins 24 outwardly of the links 22 as shown in Figure 2. The conveyor chain 6 is trained on suitable sprocket wheels some of which are motor driven, said sprocket wheels comprise a leading sprocket wheel 26 and a trailing sprocket wheel 27 at the accelerating section 8 and decelerating section 9 respectively. Preferably, the leading sprocket wheel 26 is disposed just underneath the level of the outer ends 20 and 21 of the hooks 4 and 5 when said hooks are in their limit downwardly inclined position. Also the leading sprocket wheel 26 is spaced a horizontal distance indicated at D in Figure 1a from the end of the low speed conveyor 2 corresponding to the horizontal extent of the front hook 4, such that as the front platform 1 leaves low speed conveyor 2 its front hook 4 just comes in engagement with a transverse pin of the conveyor chain 6 to hook thereon: from this moment on, the platform 1 is entirely controlled in its movement by the combined conveyor 6. At the hooking point as shown in Figure 3, the difference between the horizontal vector component of the movement of the high speed combined conveyor 6 and the horizontal vector component of the initial swinging of hook 4 is equal to the low constant speed $v$ of platform 1, such that hooking will be effected without any jerk, the outer end of the front hook 4 entering between the pins of the conveyor chain. Upward movement of said conveyor chain will cause engagement of the pin with the curved outer end of the front hook and said front hook 4 will start to raise as shown in full line in Figure 3. The conveyor 6 will thus pull platform 1 at an increasing speed as both the front hook 4 and the top run of said conveyor gradually change their inclination respectively to finally take a horizontal position, at which point the platform is now moving at high speed V corresponding to the constant speed of the conveyor 6. During this accelerating movement, the trailing hooks 5 of the platform simply come to rest on the long pins 24 on the conveyor chain 6. The length of the front hook 4 and the curve 28 of the top run of the accelerating section 6 can be calculated to obtain any type of acceleration. The decelerating section 9 of the conveyor system 6 will have along its top run a curve 29 substantially similar to curve 28 except that it will be a mirror image of the latter as shown in Figure 1b.

As the top run of the conveyor 6 starts to move downwardly its horizontal speed vector component slowly decreases and due to the inertia of the platform which tends to continue moving at speed V, the front hook 4 becomes automatically disengaged from the transverse pin of the conveyor 6 and comes to rest on the central part of the conveyor chain 6 with further platform movement. The platform will continue to move under its own inertia at a slowly decreasing speed until the portion of the top run of the conveyor 6 opposite the outer ends of the trailing hooks 5 starts to move downwardly whereby the horizontal speed vector component of said portion will gradually start to decrease and will cause hooking of said trailing hooks 5 with a long pin 24 of the conveyor chain 6; further downward movement of the conveyor chain portion along curve 29 will exert a rearwardly pulling force on the platform thereby controlling the deceleration of the same until it has attained low constant speed $v$ of the low speed conveyor 2. At this point the platform becomes engaged with the front part of said low speed conveyor 2, as shown in Figure 1b; the trailing hooks having attained their limit downwardly inclined position, they simply become unhooked from the top run of conveyor 6 as shown in Figure 4 due to the fact that said top run continue its downward movement while the trailing hooks now move only in a horizontal direction.

As shown in Figure 1b, the trailing sprocket wheel 27 of the decelerating section is spaced a horizontal distance D' from the end of the low speed conveyor 2, a horizontal distance corresponding to the horizontal extent of the trailing hooks such that as the platform leaves the decelerating section 9 it immediately becomes engaged with the low speed conveyor.

Thus, the system of the present invention enables the synchronized movement of discrete small platforms between a constant low speed for loading and unloading the platforms and a constant high speed which may be for instance ten times the low speed, and with controlled acceleration and deceleration between said speeds.

As shown in Figure 9, the system can be applied in association with a passenger transportation system in which equally spaced cabs or gondolas 30 are moving along tracks 31 at a constant high speed V' equal to the high speed V of the system previously described. The two systems are arranged for side by side movement and synchronized such that when platforms 1 move at high speed V in zone P they are opposite gondolas 30 to permit exchange of passengers between the gondolas and the platforms.

Thus, it is possible to transfer passengers from a loading station in zone Q where the platform moves at low speed $v$ unto said platform then accelerating the passengers in zone R so that they may board the high speed moving cabs 30. Similarly, passengers in the cab 30 can transfer to platforms 1 in zone P and said platforms are decelerated in zone S so that the passengers may be unloaded in zone Q.

The accelerating and decelerating system of the present invention will be provided at each station along the circuit of the public transportation system. The small platforms 1 will move in a closed circuit, means being provided for returning the platforms from the rear end to the front end of the system. Said means can consist in having the accelerating and decelerating system extend along the entire circuit of the main cab system, the high speed conveyor extending between two successive stations along said circuit, as shown in Figure 9, or separate accelerating and decelerating systems may be provided for each station.

While a preferred embodiment in accordance with the present invention has been illustrated and described it is understood that various modifications may be resorted to without departing from the spirit and scope of the appended claims.

What I claim is:

1. In a transportation system, in combination, a plurality of discrete transportation elements arranged for movement in a substantially horizontal path in a forward direction, hook members pivoted at the front part of said elements for swinging movement in a substantially vertical plane between a forwardly inclined rest position and a substantially horizontal forward position with respect to said elements, a first low speed conveyor removably engageable with said elements for moving the latter in said horizontal path at a constant low speed and means for accelerating said elements from said low speed to a constant high speed, said accelerating means including a second high speed conveyor having a plurality of anchoring means thereon for removably hooking said hook members thereto, said second conveyor travelling at said high speed and including a vertically inclined portion disposed in the path of said hook members while in their rest position, a substantially horizontal portion disposed along and substantially adjacent said horizontal path, and a curved portion disposed intermediate and merging with said inclined and horizontal portions, the hook members of said elements successively engaging the anchoring means of said inclined high speed conveyor portion upon said elements disengaging said low speed conveyor and swinging from their rest position to their horizontal position upon movement of the associated anchoring means from the inclined to the horizontal portion of said high speed conveyor, whereby said elements are pulled and accelerated by said high speed conveyor to attain said high speed due to the progressively increasing value of the difference between the horizontal vector speed components of the translational movement of said high speed conveyor and of the swinging movement of said hook members.

2. In a transportation system as claimed in claim 1, wherein the horizontal vector speed component of the inclined portion of said high speed conveyor is substantially equal to the horizontal vector speed component of said low speed conveyor.

3. In a transportation system as claimed in claim 2, wherein said hook members are disposed below said transportation elements and are downwardly inclined in their rest position.

4. In a transportation system as claimed in claim 3, wherein the length of said hook members is equal to several times the length of said transportation elements.

5. In a transportation system, in combination, a plurality of discrete transportation elements arranged for movement in a substantially horizontal path in a forward direction, leading and trailing hook members pivoted at the front and rear part of said elements respectively for swinging movement in a substantially vertical plane between an inclined rest position and a substantially horizontal position, first and third low speed conveyor for moving said elements at a constant low speed along said path, interengageable means between said elements and said first and third low speed conveyors connecting and disconnecting to said elements to and from said first and third conveyors at the leading and trailing end respectively of said first and third conveyors, a second high speed conveyor disposed intermediate said first and third conveyors for accelerating said elements to a constant high speed, for moving said elements at said constant high speed and for subsequently decelerating said elements back to said low speed, said high speed conveyor having a plurality of anchoring means thereon for removably hooking said hook members thereto, said high speed conveyor moving at constant high speed through a path comprising an intermediate substantially horizontal portion and two downwardly inclined end portions constituting an accelerating and a decelerating portion respectively, and further including curved portions bridging and merging with said horizontal and inclined portions, the lower end of said inclined portions being disposed in the path of said hook members in the rest position of the latter, the leading hook members of said elements successively engaging the anchoring means at the lower end of the accelerating high speed conveyor portion upon said elements disengaging said first low speed conveyor and swinging from their rest position to their horizontal position upon movement of the associated anchoring means from the inclined accelerating portion to the horizontal portion of said high speed conveyor, whereby said elements are pulled and accelerated by said high speed conveyor to attain said high speed, said trailing hook members engaging said anchoring means at the upper end of said decelerating conveyor portion to decelerate said elements down to said low speed when said trailing hook members move along said decelerating section.

6. In a transportation system, in combination, a continuous track, a plurality of discrete wheeled transportation platforms arranged for movement on said track in a forward direction, first and third low speed conveyors spacedly disposed along said track, for moving said platforms at a constant low speed along said track, and a second high speed conveyor disposed intermediate said first and third conveyors for accelerating said platforms to a constant high speed, for moving said platforms at said constant high speed and for subsequently decelerating said platforms back to said low speed, said high speed conveyor moving at said constant high speed through a path comprising an intermediate substantially horizontal portion disposed along said track and two downwardly inclined end portions, constituting an accelerating and a decelerating portion respectively, and further including curved portions bridging and merging with said horizontal and inclined portions, releasable interengageable means between said platforms and said first and third low speed conveyors connecting and disconnecting said platforms to and from said first and third conveyors at the leading and trailing end respectively of said first and third conveyors, hook members pivoted to said platforms for swinging movement in a vertical plane containing said high speed conveyor, said hook members including a front hook member and trailing hook members for each platform, means on said platforms to normally maintain said hook members in a downwardly inclined rest position in the path of the lower ends of said accelerating and decelerating conveyor portions, a plurality of anchoring means on said high speed conveyor for removably hooking said hook members thereto, the horizontal distance between the end of the first low speed conveyor means and the lower end of the inclined accelerating conveyor portion of the high speed conveyor being such that as a platform leaves said first low speed conveyor, its front hook member engages said anchoring means at the lower end of said accelerating conveyor portion whereby said hooked platform is pulled and accelerated along said track by said accelerating portion until it attains said high speed when said front hook member moves along said horizontal section, said trailing hook members engaging said anchoring means at the upper end of said decelerating conveyor portion to decelerate said platform when said trailing hook members move along said decelerating portion, the horizontal distance between the lower end of said decelerating portion and the leading end of said third conveyor being such that as said trailing hook members clear said decelerating portion upon attaining their downwardly inclined limit position, said platform becomes engaged by the interengageable means of said third conveyor.

7. In a transportation system as claimed in claim 6, wherein said hook members have a length equal to several times the length of a platform.

8. In a transportation system as claimed in claim 7, wherein there is one front hook member which lies in the central vertical plane of each platform and there are two trailing hook members lying in vertical plane on each side of said front hook member, such that the platforms may be disposed side by side with the respective hook members intercepting one another.

9. In a transportation system as claimed in claim 8, wherein said high speed conveyor includes an endless conveyor chain consisting of links and transverse pins interconnecting said links, alternate one of said pins projecting laterally of the chain, said front hook member of each platform adapted to engage said pins between said links, and said trailing hook members of said platform adapted to engage the laterally projecting pins on the outside of said links, said pins constituting said anchoring means.

10. In a passenger transportation system as claimed in claim 6, further including equally spaced transportation cabs moving in a path alongside said track adjacent the high speed section of the platforms, at a constant high speed equal to the platform high speed, said cabs and platforms being arranged so as to be opposite each other when travelling at said high speed to enable transfer of passengers between the same.

11. In a transportation system as claimed in claim 6, wherein the horizontal vector component of the speed of the end parts of said accelerating and decelerating portions is substantially equal to the horizontal vector component of the speed of said low speed conveyors.

References Cited in the file of this patent

UNITED STATES PATENTS

| | | |
|---|---|---|
| 2,018,238 | Storer | Oct. 22, 1935 |
| 2,756,686 | Kendall et al. | July 31, 1956 |
| 2,862,603 | Sinden | Dec. 2, 1958 |